US008763212B2

(12) United States Patent
Scroggie et al.

(10) Patent No.: US 8,763,212 B2
(45) Date of Patent: Jul. 1, 2014

(54) MULTI-PIECE SNAP CLIP FASTENER

(75) Inventors: David D. Scroggie, Macomb, MI (US); Robert Osterland, East China, MI (US); Aaron Jagoda, Richmond, MI (US)

(73) Assignee: Illinois Tool Works Inc., Glenview, IL (US)

( * ) Notice: Subject to any disclaimer, the term of this patent is extended or adjusted under 35 U.S.C. 154(b) by 131 days.

(21) Appl. No.: 13/496,270

(22) PCT Filed: Aug. 10, 2010

(86) PCT No.: PCT/US2010/044961
§ 371 (c)(1),
(2), (4) Date: Mar. 15, 2012

(87) PCT Pub. No.: WO2011/034669
PCT Pub. Date: Mar. 24, 2011

(65) Prior Publication Data
US 2012/0174345 A1     Jul. 12, 2012

Related U.S. Application Data

(60) Provisional application No. 61/242,902, filed on Sep. 16, 2009.

(51) Int. Cl.
| F16B 5/06 | (2006.01) |
| F16B 5/12 | (2006.01) |
| F16B 11/00 | (2006.01) |
| F16B 21/08 | (2006.01) |

(52) U.S. Cl.
CPC .............. *F16B 5/123* (2013.01); *F16B 11/006* (2013.01); *F16B 5/0628* (2013.01); *F16B 21/086* (2013.01)
USPC .............................. 24/297; 24/581.11; 24/458

(58) Field of Classification Search
CPC ...... F16B 5/0628; F16B 5/123; F16B 21/086; F16B 11/006; B60R 13/0206
USPC ........... 24/297, 289, 293, 295, 453, 457, 458, 24/581.11; 411/508–510; 52/716.5; 296/1.08, 214, 146.7
See application file for complete search history.

(56) References Cited

U.S. PATENT DOCUMENTS 5,195,793 A * 3/1993 Maki ............................. 293/155
5,301,396 A * 4/1994 Benoit ............................ 24/453
(Continued)

FOREIGN PATENT DOCUMENTS

| EP | 0641939 A1 | 3/1995 |
| EP | 0943751 A2 | 9/1999 |
| FR | 2576370 A1 | 7/1986 |

OTHER PUBLICATIONS

ISR for PCT/US2010/044961 dated Nov. 23, 2010.

*Primary Examiner* — Robert J Sandy
*Assistant Examiner* — Caroline L Natirboff
(74) *Attorney, Agent, or Firm* — Mark W. Croll; Paul F. Donovan

(57) ABSTRACT

A multi-piece snap-in fastener adapted to adjoin a surface element to a backing panel. The fastener includes a docking base of tray-like construction including a pair of opposing lateral sidewalls including at least one inboard protuberance element projecting in overlying relation to the interior surface. A displaceable clip head including at least one male projection element extending outwardly from one side of a support platform is configured for insertion in nesting relation between the lateral sidewalls. The support platform includes outboard protuberance elements projecting outwardly from lateral sides of the support platform such that upon insertion of the support platform between the lateral sidewalls, the outboard protuberance elements are disposed in underlapping relation to opposing inboard protuberance elements projecting from the lateral sidewalls.

19 Claims, 5 Drawing Sheets

(56) References Cited

U.S. PATENT DOCUMENTS

| | | | |
|---|---|---|---|
| 5,347,691 A * | 9/1994 | Terazoe | 24/295 |
| 5,353,571 A * | 10/1994 | Berdan et al. | 52/716.5 |
| 5,507,610 A * | 4/1996 | Benedetti et al. | 411/339 |
| 6,253,423 B1 | 7/2001 | Friedrich et al. | |
| 6,772,484 B2 * | 8/2004 | Miyano et al. | 24/297 |
| 6,994,504 B2 * | 2/2006 | Gordon | 411/508 |
| 7,152,281 B2 * | 12/2006 | Scroggie | 24/297 |
| 7,165,371 B2 * | 1/2007 | Yoyasu | 52/716.5 |
| 7,407,224 B2 * | 8/2008 | Okabe et al. | 296/210 |
| 7,942,474 B2 * | 5/2011 | Jones | 296/214 |
| 2003/0159256 A1 * | 8/2003 | Clarke | 24/297 |
| 2004/0083583 A1 * | 5/2004 | Bradley et al. | 24/297 |

* cited by examiner

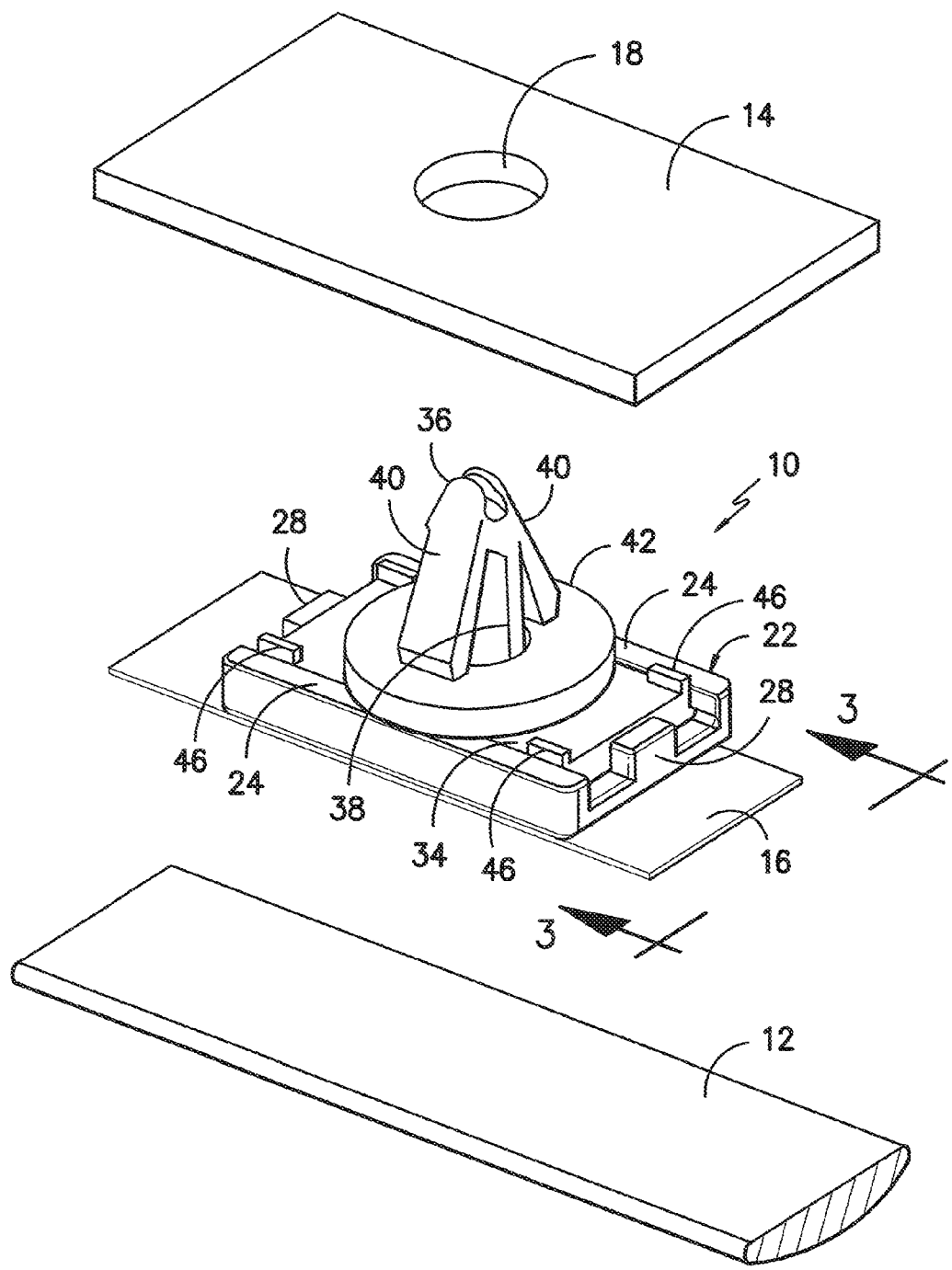
FIG. -1-

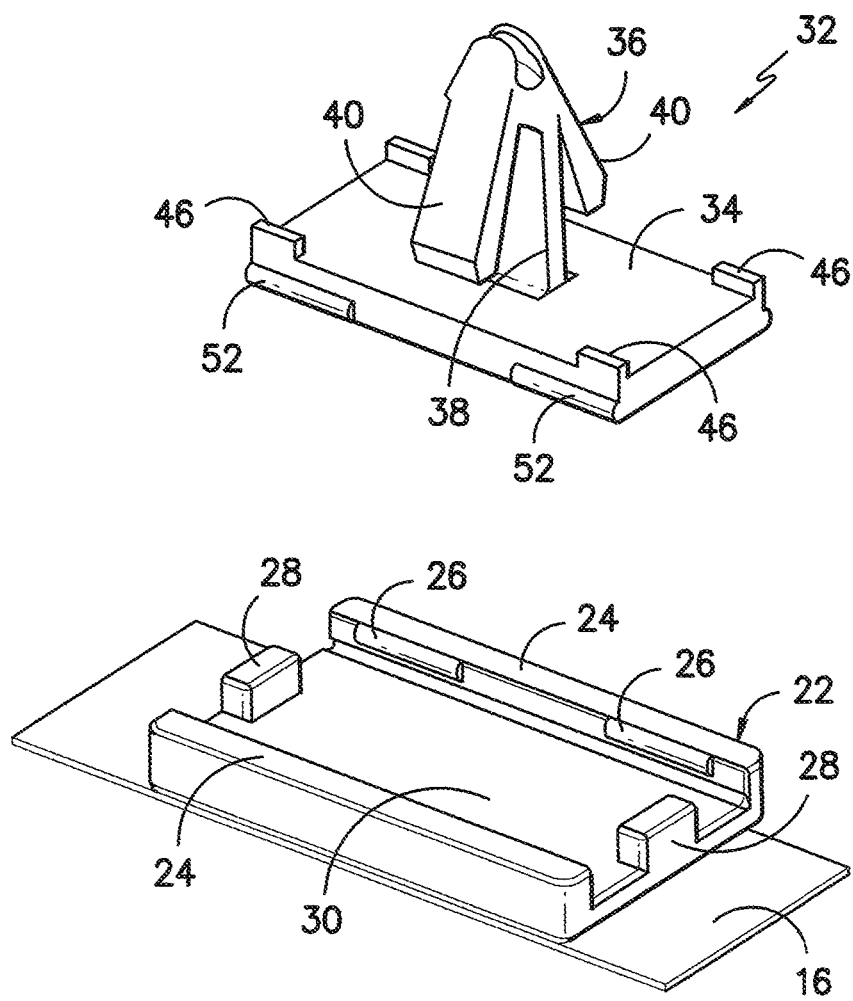
FIG. -2-

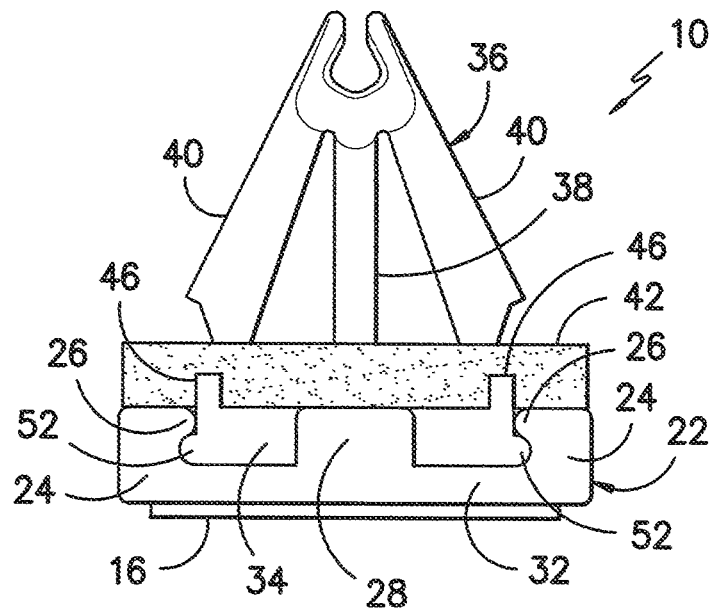
FIG. -3-
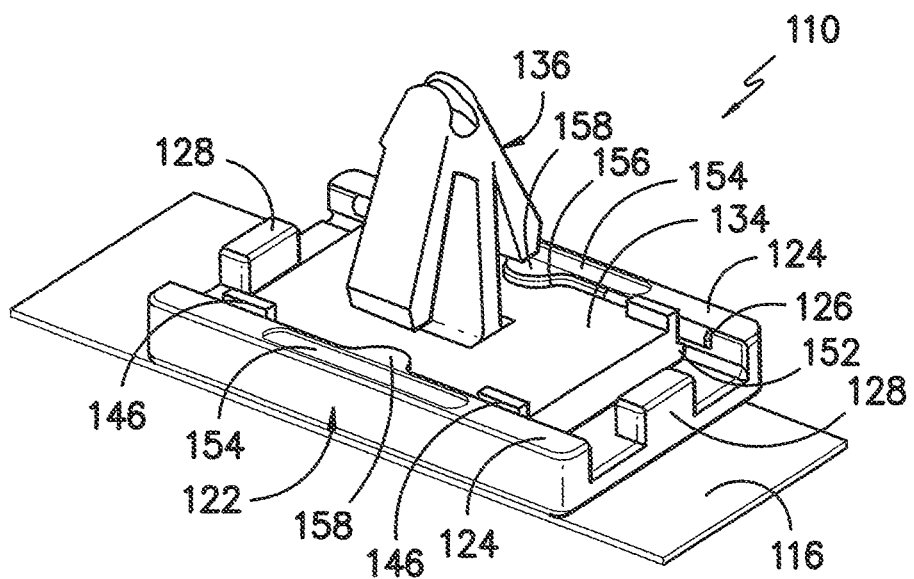
FIG. -4-

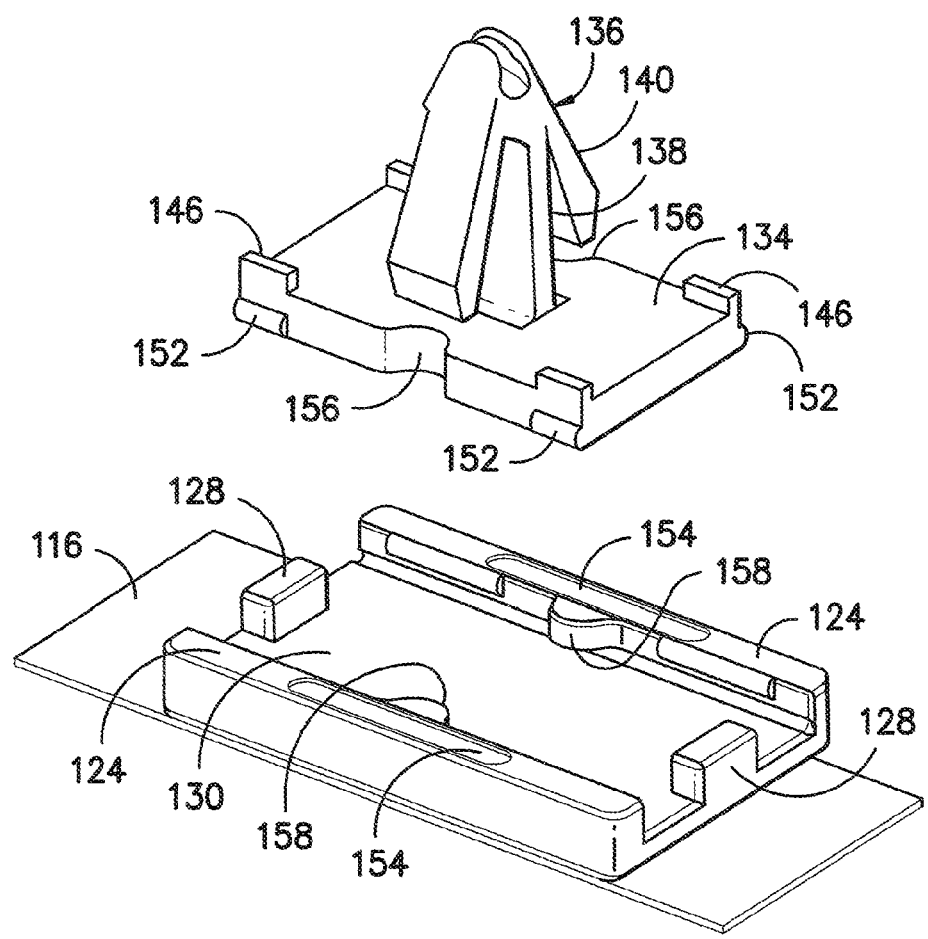
FIG. -5-

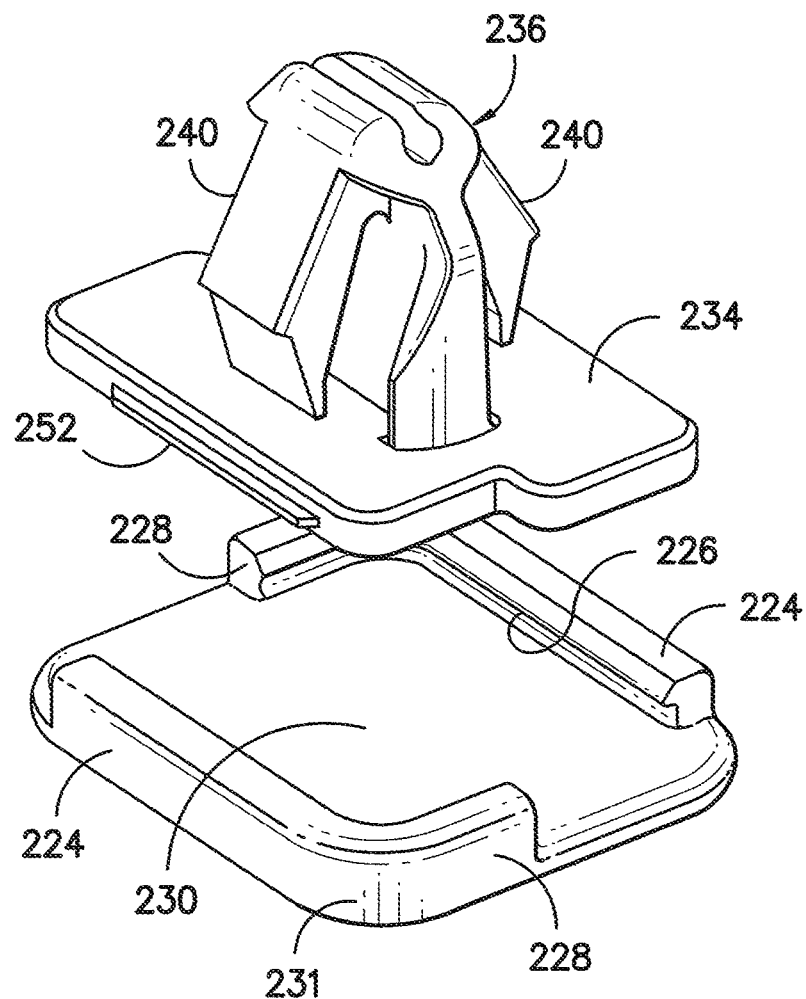
FIG. −6−

MULTI-PIECE SNAP CLIP FASTENER

CROSS-REFERENCE TO RELATED APPLICATION

This non-provisional application is national phase of PCT/US2010/044961 filed Aug. 10, 2010, and claims the benefit of, and priority from, U.S. Provisional Application 61/242,902 filed Sep. 16, 2009.

TECHNICAL FIELD

The present invention relates generally to a snap clip fastener system, and more particularly, to a multi-piece fastener system including an outwardly projecting male member adapted to be removeably mounted within a separate support base. In operation, the fastener system provides a connection between a first structure and an opposing structure. The present invention is particularly adapted to provide a snap-in connection between trim elements and backing support panels in environments such as automotive and appliance manufacturing. The present invention facilitates adaption to thermal expansion and variation in the opposing structures while aiding in serviceability and attachment using tape or other intermediate adhesive elements.

BACKGROUND OF THE INVENTION

There are many situations in which support panels of sheet metal or the like must be adjoined to moldings or other coverings. For esthetic and functional reasons it may be undesirable to utilize screws or other connectors extending through the outer covering structure. In such environments it is known to adhere single-piece snap clip fasteners to an inner face of the moldings or other coverings using tape or other adhesive materials. Outwardly projecting portions of the fasteners then snap into slots in the support panel.

The prior single-piece snap clip systems have faced difficulties in adjusting for positional variations between the support panels and the trim. Specifically, in the prior systems, the snap clips may be difficult to align precisely with the acceptance openings in the support panels due to manufacturing variations and/or thermal expansion. To compensate for such variation it has been common practice to utilize elongated acceptance slots rather than holes in the underlying support panel to provide an extended insertion target for the fastening clip. However, the use of acceptance slots rather than holes may not provide ideal sealing. Thus, a larger sealing element may be required to cover the slot. Prior systems have sometimes also faced difficulty in providing strong bonding relationships between the clip and the tape or other adhesive structure providing the connection to the molding. In this regard, the desired materials for use in providing a strong snap-in relation between the clip and the backing panel may be difficult to adhere to the tape or other adhesive connector. Thus, additional tape or other adhesive may be required to secure the clip to the trim element. Prior systems have also provided limited ability for removal and replacement. In this regard, in the prior single-piece system, once the connection is made, there is limited ability to remove the trim element for servicing without damaging the clips and/or the trim element in the process. It has also been difficult to achieve effective straight loading while maintaining a low overall profile for the clips.

Consequently, there is a continuing need for a low profile snap clip fastener that adapts to manufacturing variances and thermal expansion and which can be readily disengaged for servicing following initial attachment.

SUMMARY OF THE INVENTION

The present invention provides advantages and alternatives over the prior art by providing a snap clip fastener construction in which the fastener incorporates a base of shallow tray construction adapted for operative connection to a trim element or other structure by tape or other adhesive mechanism. A male member is removeably retained at the interior of the base. Upon assembly, the male member projects outwardly from the base for snap-in engagement with a corresponding opening in an opposing support panel or other structure. The base and the male member may be formed from different materials if desired to promote different functionalities. The male member and the base may be separated subsequent to establishing an initial connection thereby providing the ability to remove the trim element from the support panel for servicing.

In accordance with one exemplary aspect, the present invention provides a multi-piece snap-in fastener adapted to adjoin a surface element to a backing panel. The fastener includes a docking base of tray-like construction adapted for adhesive bonding connection to one side of the surface element. The docking base includes a pair of opposing lateral sidewalls disposed in raised relation adjacent an interior surface. The lateral sidewalls may include at least one inboard protuberance element projecting in overlying relation to the interior surface. The fastener further includes a displaceable clip head including at least one male projection element extending outwardly from one side of a support platform. The male projection element is adapted for snap fit insertion through an acceptance opening in the backing panel. The support platform is configured for insertion in nesting relation between the lateral sidewalls. The support platform includes outboard protuberance elements projecting outwardly from lateral sides of the support platform such that upon insertion of the support platform between the lateral sidewalls, the outboard protuberance elements are disposed in underlapping relation to opposing inboard protuberance elements projecting from the lateral sidewalls.

In accordance with another exemplary aspect, the present invention provides a multi-piece snap-in fastener adapted to adjoin a surface element to a backing panel. The fastener includes a docking base of tray-like construction adapted for adhesive bonding connection to one side of the surface element. The docking base includes a pair of opposing lateral sidewalls and a pair of opposing end wall elements. The lateral sidewalls and end wall elements cooperatively define a discontinuous raised perimeter disposed in raised relation about an interior surface, the lateral sidewalls each include at least one rounded inboard protuberance element projecting in overlying relation to the interior surface. The fastener further includes a displaceable clip head including at least one male projection element extending outwardly from one side of a support platform. The male projection element is adapted for snap fit insertion through an acceptance opening in the backing panel. The support platform is configured for insertion in nesting relation between the lateral sidewalls. The support platform includes rounded profile outboard protuberance elements projecting outwardly from lateral sides of the support platform such that upon insertion of the support platform between the lateral sidewalls, the outboard protuberance elements are disposed in underlapping relation to opposing inboard protuberance elements projecting from the lateral sidewalls. The support platform further includes a plurality of standoff posts projecting in the same direction as the male projection element and having a height such that when the outboard protuberance elements are disposed in underlapping relation to opposing inboard protuberance elements, the standoff posts extend above the lateral sidewalls.

In accordance with yet another exemplary aspect, the present invention provides a multi-piece snap-in fastener adapted to adjoin a surface element to a backing panel. The fastener includes a docking base of tray-like construction adapted for adhesive bonding connection to one side of the surface element. The docking base includes a pair of opposing lateral sidewalls and a pair of opposing end wall elements. The lateral sidewalls and end wall elements cooperatively define a discontinuous raised perimeter disposed in raised relation about an interior surface. The lateral sidewalls each include at least one rounded inboard protuberance element projecting in overlying relation to the interior surface. At least one of the lateral sidewalls includes a slot extending from an upper surface to define a split wall construction with a positioning protrusion extending inwardly from the inner wall surface. The fastener further includes a displaceable clip head including at least one male projection element extending outwardly from one side of a support platform. The male projection element is adapted for snap fit insertion through an acceptance opening in the backing panel. The support platform is configured for insertion in nesting relation between the lateral sidewalls. The support platform includes rounded profile outboard protuberance elements projecting outwardly from lateral sides of the support platform such that upon insertion of the support platform between the lateral sidewalls, the outboard protuberance elements are disposed in underlapping relation to opposing inboard protuberance elements projecting from the lateral sidewalls. The support platform further includes at least one thermal expansion cut-out disposed at a lateral side of the support platform and a plurality of standoff posts projecting in the same direction as the male projection element. The thermal expansion cut-out is adapted to mesh with an opposing positioning protrusion. The standoff posts have a height such that when the outboard protuberance elements are disposed in underlapping relation to opposing inboard protuberance elements, the standoff posts extend above the lateral sidewalls.

Other aspects and advantages of the invention will become apparent from a description of certain present preferred embodiments thereof which are shown in the drawings.

BRIEF DESCRIPTION OF THE DRAWINGS

FIG. 1 is an assembly view illustrating an assembled exemplary snap clip fastener consistent with the present invention disposed in position between a trim element and a backing panel to be adjoined;

FIG. 2 is an exploded view illustrating the exemplary snap clip fastener of FIG. 1 with the male member removed from the docking base;

FIG. 3 is an end view of the assembled exemplary snap clip fastener taken generally along line 3-3 in FIG. 1 with the male member held within the docking base;

FIG. 4 illustrates a second embodiment of a snap clip fastener consistent with the present invention with the male member held within the docking base;

FIG. 5 is an exploded view illustrating the exemplary snap clip fastener of FIG. 4 with the male member removed from the docking base; and FIG. 6 is an exploded view illustrating a third embodiment of a snap clip fastener consistent with the present invention with the male member removed from the docking base.

Before the exemplary embodiments of the invention are explained in detail, it is to be understood that the invention is in no way limited in its application or construction to the details and the arrangements of the components set forth in the following description or illustrated in the drawings. Rather, the invention is capable of other embodiments and being practiced or being carried out in various ways. Also, it is to be understood that the phraseology and terminology used herein are for purposes of description only and should not be regarded as limiting. The use herein of terms such as "including" and "comprising" and variations thereof is meant to encompass the items listed thereafter and equivalents thereof as well as additional items and equivalents thereof.

DETAILED DESCRIPTION OF THE PREFERRED EMBODIMENTS

Reference will now be made to the drawings, wherein to the extent possible, like elements are designated by like reference numerals throughout the various views. Referring jointly to FIGS. 1, 2 and 3, a first embodiment of a multi-piece snap clip fastener 10 is shown. As illustrated, the snap clip fastener 10 is adapted for disposition in adjoining relation between a first element 12 such as an outwardly visible automotive or appliance trim structure or the like and a second element 14 such as a backing support panel of sheet metal or other suitable material. In practice, the snap clip fastener 10 may be secured across a rear face of the first element 12 by use of double sided tape 16 or other suitable adhesive structure as may be desired. With the snap clip fastener 10 secured in place, the first element 12 may then be adjoined to the second element 14 by pressing an outwardly projecting portion of the snap clip fastener 10 through a corresponding acceptance opening 18 in the second element 14 to establish a snap-fit connection in a manner as will be described further hereinafter. With this connection established, the first element 12 thus forms a covering across the second element 14 without visible connection points. Accordingly, the outer appearance of the first element 12 is substantially undisturbed. Of course, it is to be understood that while only a single snap clip fastener 10 and corresponding acceptance opening 18 are shown, in actual practice numerous snap clip fasteners 10 are typically used across the first element for alignment with corresponding acceptance openings to provide the desired connection.

As best seen through joint reference to FIGS. 2 and 3, in the exemplary construction the snap clip fastener 10 includes a relatively low profile docking base 22 of shallow tray construction for disposition across a side of the double sided tape 16 facing away from the trim element. In this regard, the docking base 22 may be molded as a single piece from polymer material such as nylon, polyester, polypropylene, ABS or other suitable material which provides good adhesion to the tape 16. Molded nylon or ABS (acrylonitrile butadiene styrene) may be particularly desirable.

In the illustrated exemplary embodiment, the docking base 22 is generally rectangular and includes a pair of lateral sidewalls 24 extending substantially along the length dimension of the docking base. In this regard, while a substantially rectangular configuration may be desirable for many environments of use, it is likewise contemplated that any number of other geometries also may be used if desired. As shown, in the exemplary embodiment inboard protuberance elements 26 of rounded profile extend at least partially along the length of the inboard surface of the lateral sidewalls 24. The inboard protuberance elements 26 are positioned generally adjacent to the upper edges of the lateral sidewalls to define inwardly projecting overhang ledges with rounded interior edges.

While the illustrated exemplary construction incorporates a pair of inboard protuberance elements of elongated geometry at each lateral sidewall, it is contemplated that a greater or lesser number of inboard protuberance elements 26 may be present as desired. As will be described further hereinafter, the inboard protuberance elements 26 act to secure a clip head in place relative to the docking base 22 following full assembly of the fastener 10 (FIG. 3).

In the illustrated exemplary embodiment, the docking base 22 also includes a pair of upstanding end wall elements 28 disposed in opposing relation to one another. In the exemplary arrangement the end wall elements 28 are generally centered along the width dimension of the docking base 22 and occupy only a portion of the width dimension. This arrangement provides open spaces between the lateral sidewalls 24 and the end wall elements 28. In such an arrangement, the lateral sidewalls 24 and the end wall elements 28 cooperatively define a discontinuous raised perimeter disposed about a depressed interior portion 30. As will be appreciated, due to the discontinuous configuration of the raised perimeter, the lateral sidewalls 24 may flex independently from the end wall elements 28 which act to control the adjustment or float of a related clip head 32 (FIG. 2) relative to the docking base 22. In this regard, it is to be understood that while the end wall elements 28 are illustrated in various embodiments as being independent of the lateral sidewalls 24, it is also contemplated that one or both of such end wall elements 28 may be connected to one or both of the lateral sidewalls 24 if desired.

As shown, the exemplary snap clip fastener 10 includes a clip head designated generally as 32 (FIG. 2). In the exemplary embodiment, the clip head 32 includes a support platform 34 and a male projection element 36 extending outwardly from the support platform 34. In the illustrated arrangement the male projection element 36 has a generally "W" shaped configuration including a center post 38 and a pair of flexible wing elements 40 extending in downwardly angled relation away from the distal end of the center post 38. As will be appreciated, upon insertion of the male projection element 36 into the acceptance opening 18, the wing elements 40 will initially flex inwardly towards the center post 38 as they pass through the acceptance opening 18. Upon full insertion the compressing forces are relieved and the wing elements 40 then spring outwardly thereby locking the second element 14 in place in opposing relation to the support platform 34. Of course, while the illustrated "W" shaped configuration may be desirable in a number of environments of use, other snap-in configurations may likewise be utilized if desired.

As illustrated in FIG. 1, a collar-like seal element 42 of compressible material such as rubber or the like may be disposed about the male projection element 34 in surrounding relation to the center post 38 at a position below the wing elements 40 if desired. As shown, portions of the seal element 42 extend radially outward from the wing elements 40. As will be appreciated, with the male projection element 36 in inserted relation within the acceptance opening 18, the seal element 42 will form a compression seal between the support platform 34 and the opposing surface of the second element 14.

The clip head 32 may be molded as a single piece structure from a material providing substantial strength and resilience to form the desired snap-in locking relation. By way of example only and not limitation, one suitable material for forming the clip head 32 is an acetal resin (polyoxymethylene). As will be appreciated, acetal resins tend to have a relatively high degree of crystallinity which provides enhanced strength, fatigue resistance, surface hardness, lubricity and resilience.

In the exemplary embodiment, integral standoff posts 46 project outwardly from the upper surface of the support platform 34. As best seen in FIGS. 1 and 3, in the final assembled condition the standoff posts 46 project above the lateral sidewalls 24 and the end wall elements 28 on the docking base 22. As shown, the standoff posts 46 are arranged at positions outboard from the zone occupied by the seal element 42 and have a height slightly less than the uncompressed thickness of the seal element 42. In this arrangement, the standoff posts 46 act as contact points with the surface of the backing panel or other second element 14 and aid in controlling the spacing between elements in final connected relation. Moreover, the standoff posts 46 aid in controlling the working height of the seal element 42. In the illustrated exemplary construction, the standoff posts 46 are positioned generally at the corners of the support platform 34. However, other positional arrangements may be used if desired.

As noted previously, the clip head 32 is adapted to be snapped into place at the interior portion 30 of the docking base 22. In this arrangement, the support platform 34 is disposed in nesting relation to the lateral sidewalls 24 and the end wall elements 28 on the docking base 22. As best seen through joint reference to FIGS. 2 and 3, in the exemplary construction outboard protuberance elements 52 of rounded profile extend at least partially along the length of the lateral sides of the support platform 34. In this regard, the outboard protuberance elements 52 are positioned generally adjacent to the lower edges of the support platform 34. While the illustrated exemplary construction incorporates a pair of outboard protuberance elements 52 along each lateral edge, it is contemplated that a greater or lesser number of inboard protuberance elements 26 may be present as desired.

In the exemplary construction the inboard protuberance elements 26 disposed along the interior of the lateral sidewalls 24 cooperate with the outboard protuberance elements 52 disposed along the support platform 34 to secure the clip head 32 in place relative to the docking base 22. Specifically, as the support platform 34 is pushed into the interior portion 30 of the docking base 22, the outboard protuberance elements 52 engage the inboard protuberance elements 26, thereby causing the lateral sidewalls 24 to flex outward slightly during the insertion as the rounded surfaces pass over one another. The lateral sidewalls 24 then spring back into place in overlying relation to the outboard protuberance elements (FIG. 3) once insertion is complete. In this arrangement, the outboard protuberance elements 52 are thus captured in the undercut below the inboard protuberance elements 26 and are blocked against withdrawal. Accordingly, in the absence of a substantial applied axial force, the clip head 32 is held in place within the docking base 22.

It is to be understood that while the interlocking inboard protuberance elements 26 and outboard protuberance elements 52 have been illustrated as elongated ribs, it is likewise contemplated that any number of other configurations may be used including discrete bumps, segmented rib structures or the like as well as combinations of various configurations. Moreover, the inboard protuberance elements 26 and outboard protuberance elements 52 may be either similar or dissimilar from one another. By way of example only, the inboard protuberance elements 26 may be in the form of relatively short bumps while the outboard protuberance elements 52 may have a longer shape or this arrangement may be reversed.

The multi-piece construction of the present invention provides a number of significant benefits. In particular, such a construction permits the portions of the snap clip fastener 10 contacting the tape 16 or other adhesive element to be formed from a polymeric material such as nylon, polyester, polypropylene, ABS or the like which provides good adhesive bonding contact. At the same time, the clip head 32 may be formed from a high strength material such as acetal resin or the like which provides desirable strength and resiliency characteristics but which may not be well suited for adhesive bonding. Moreover, the nested insertion of the support platform 34 into the low profile interior portion of the docking base 22 provides the snap clip fastener with a relatively low operating profile thereby facilitating a close bonding relation between the trim and the backing support. In addition, although the clip head 32 is held securely in place under normal operating conditions, it may nonetheless be separated by application of a sufficient axial force. This facilitates the ability to remove the trim or other surface structure for servicing without causing damage to the trim.

In the arrangement illustrated in FIGS. 1-3, the support platform 34 may substantially match the size and shape of the interior portion 30 of the docking base 22 such that little if any relative movement is permitted between the docking base 22 and the clip head 32. Alternatively, the length dimension of the support platform 34 may be smaller than the length dimension of the interior portion 30 of the docking base 22 such that the clip head 32 may float in sliding relation between the end wall elements 28 if desired. Such a sliding relation may aid in providing alignment between the snap clip fastener and an acceptance opening which may be slightly out of place.

By way of example only, and not limitation, FIGS. 4 and 5 illustrate a second exemplary embodiment wherein elements corresponding to those previously described are designated by like reference numerals increased by 100. As shown, in this embodiment the snap clip fastener 110 includes a support platform 134 for the male projection element 136 which is slightly shorter than the distance between the end wall elements 128. Thus, following insertion of the clip head into the docking base 122, the support platform 134 may be maneuvered along the length of the docking base 122 between the end wall elements 128 thereby providing a corresponding movement of the male projection element 136. As described previously, such movement may facilitate alignment with out of position acceptance openings.

As shown, in the embodiment of FIGS. 4 and 5, the lateral sidewalls 124 of the docking base 122 may include an integrated slot 154 extending into the interior of the lateral sidewalls to form a double wall construction over at least a portion of the length of the sidewalls with a positioning protrusion 158 extending inwardly from the inner surface. As will be appreciated, the incorporation of this slot feature facilitates controlled flexing of the inward sidewalls during sliding manipulation between the clip head and the docking base. This provides additional control over the degree of effort required for positioning control and disengagement for sliding movement.

The snap clip fastener 110 illustrated in FIGS. 4 and 5 also includes thermal expansion cut-outs 156 of scalloped configuration (best seen in FIG. 5) projecting inwardly from opposing lateral edges of the clip head support platform 134. As will be appreciated, the presence of the cut-outs 156 works in conjunction with the positioning protrusions 158 and integrated slots 154 in accommodating naturally occurring expansion and contraction that takes place due to temperature changes while maintaining the position of the clip head within the docking base 122 during shipment and assembly of the final fastener 110 in connecting relation between adjoined structures. Accordingly, thermal variations may be accommodated while maintaining a generally centered relation for the clip head. This, in turn may aid the user in the alignment process during use.

FIG. 6 illustrates another exemplary embodiment wherein elements corresponding to those previously described are designated by like reference numerals increased by 200. As shown, in this embodiment the end wall elements 228 are each adjoined to one of the lateral sidewalls 224 at a corner connection 231 to form a pair of generally "L" shaped barrier wall structures in which the short leg extends partially along the width dimension of the docking base. The "L" shaped barrier wall structures cooperatively form a discontinuous raised perimeter. As shown, each of the lateral sidewalls 224 includes an inboard protuberance element 226 which cooperates with an outboard protuberance element 252 (only one shown) extending from each lateral side of the support platform 234 of the clip head in the manner as described previously.

In the configuration shown in FIG. 6, the depressed interior portion 230 has a pair of open corners in diagonal relation to one another. The support platform 234 of the clip head has a profile substantially matching that of the depressed interior such that extended corner segments of the support platform 234 may fit into the open corners of the depressed interior portion 230. As will be appreciated, in this arrangement, the extended corner segments of the support platform 234 are held at the open corners between an end wall elements 228 and an opposing sidewall 224 to provide further stability. Of course, any number of other arrangements may likewise be utilized.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context. The claims are to be construed to include all alternative embodiments and equivalents to the extent permitted by the prior art.

The invention claimed is:

1. A multi-piece snap-in fastener adapted to adjoin a surface element to a backing panel, the fastener comprising:
a single piece docking base of tray-like construction adapted for adhesive bonding connection to one side of the surface element, the docking base including a pair of opposing lateral sidewalls disposed in raised relation adjacent an interior surface, the interior surface defining a depressed interior portion of the docking base extending in spanning relation between the lateral sidewalls, the lateral sidewalls each including at least one inboard protuberance element projecting in overlying relation to the interior surface, wherein the docking base further includes a pair of opposing end wall elements, at feast portions of said end wall elements occupying positions in the width dimension of the docking base inboard from said inboard protuberance elements, the lateral sidewalls and end wall elements cooperatively defining a discontinuous raised perimeter disposed in raised relation about said interior surface; and a displaceable clip head including at least one male projection element extending outwardly from one side of a support platform, the male projection element being adapted for snap fit insertion through an acceptance opening in the backing panel, the support platform being configured for press fit insertion into the docking base in nesting relation between the lateral sidewalls, the support platform including outboard protuberance elements projecting outwardly from lateral sides of the support platform such that during insertion of the support platform between the lateral sidewalls, the outboard protuberance elements pass over said inboard protuberance elements and the lateral sidewalls flex outwardly and rebound such that the outboard protuberance elements are disposed in underlapping relation to opposing said inboard protuberance elements projecting from the lateral sidewalls.

2. The multi-piece snap-in fastener as recited in claim 1, wherein the docking base and the clip head are formed from different materials.

3. The multi-piece snap-in fastener as recited in claim 2, wherein the docking base is a one piece molded structure formed from a nylon or ABS polymer, and wherein the clip head is a one piece molded structure formed from acetal resin.

4. The multi-piece snap-in fastener as recited in claim 1, wherein the support platform of the clip head has a length dimension matching the distance between the end wall elements such that upon insertion of the support platform between the lateral sidewalls, the support platform is blocked from sliding relative to the end wall elements.

5. The multi-piece snap-in fastener as recited in claim 1, wherein the support platform of the clip head has a length dimension which is shorter than the distance between the end wall elements such that upon insertion of the support platform between the lateral sidewalls, the support platform is slideable relative to the end wall elements.

6. The multi-piece snap-in fastener as recited in claim 1, wherein the male projection element has a W-shaped construction including a center post projecting outwardly from the support platform and a pair of flexible wing elements extending in downwardly angled relation from a distal end of the center post.

7. The multi-piece snap-in fastener as recited in claim 1, wherein the support platform includes a plurality of standoff posts projecting in the same direction as the male projection element, the standoff posts having a height such that when the outboard protuberance elements are disposed in underlapping relation to opposing said inboard protuberance elements, the standoff posts extend above the lateral sidewalls.

8. The multi-piece snap-in fastener as recited in claim 1, wherein the support platform includes at least one thermal expansion cut-out disposed at a lateral side of the support platform.

9. The multi-piece snap-in fastener as recited in claim 8, wherein at least one of the lateral sidewalls includes a slot extending from an upper surface to define a split wall construction at least partially along the length of said at least one of the lateral sidewalls and a positioning protrusion extending inboard from said at least one of the lateral sidewalls for engagement with said at least one thermal expansion cut-out.

10. A multi-piece snap-in fastener adapted to adjoin a surface element to a backing panel, the fastener comprising:

a single piece docking base of tray-like construction adapted for adhesive bonding connection to one side of the surface element, the docking base including a pair of opposing lateral sidewalls and a pair of opposing end wall elements, the lateral sidewalls and end wall elements cooperatively defining a discontinuous raised perimeter disposed in raised relation about an interior surface, the interior surface defining a depressed interior portion of the docking base extending in spanning relation between the lateral sidewalls, the lateral sidewalls each including at least one rounded inboard protuberance element projecting in overlying relation to the interior surface; and a displaceable clip head including at least one male projection element extending outwardly from one side of a support platform, the male projection element being adapted for snap fit insertion through an acceptance opening in the backing panel, the support platform being configured for press-fit insertion into the docking base in nesting relation between the lateral sidewalls, the support platform including rounded profile outboard protuberance elements projecting outwardly from lateral sides of the support platform such that during insertion of the support platform between the lateral sidewalls, the outboard protuberance elements pass over said inboard protuberance elements and the lateral sidewalls flex outwardly and rebound such that the outboard protuberance elements are disposed in underlapping relation to opposing said inboard protuberance elements projecting from the lateral sidewalls, wherein the lateral sidewalls are flexible independently of the end wall elements and wherein the support platform further includes a plurality of standoff posts projecting in the same direction as the male projection element, the standoff posts having a height such that when the outboard protuberance elements are disposed in underlapping relation to opposing said inboard protuberance elements, the standoff posts extend above the lateral sidewalls and wherein at least portions of said end wall elements occupy positions in the width dimension of the docking base inboard from said inboard protuberance elements.

11. The multi-piece snap-in fastener as recited in claim 10, wherein the docking base and the clip head are formed from different materials.

12. The multi-piece snap-in fastener as recited in claim 11, wherein the docking base is a one piece molded structure formed from a nylon or ABS polymer, and wherein the clip head is a one piece molded structure formed from acetal resin.

13. The multi-piece snap-in fastener as recited in claim 10, wherein the support platform of the clip head has a length dimension matching the distance between the end wall elements such that upon insertion of the support platform between the lateral sidewalls, the support platform is blocked from sliding relative to the end wall elements.

14. The multi-piece snap-in fastener as recited in claim 10, wherein the support platform of the clip head has a length dimension which is shorter than the distance between the end wall elements such that upon insertion of the support platform between the lateral sidewalls, the support platform is slideable relative to the end wall elements.

15. The multi-piece snap-in fastener as recited in claim 10, wherein the male projection element has a W-shaped construction including a center post projecting outwardly from the support platform and a pair of flexible wing elements extending in downwardly angled relation from a distal end of the center post.

16. The multi-piece snap-in fastener as recited in claim 10, wherein the support platform includes a pair of thermal expansion cut-outs of scalloped configuration extending inboard from opposing lateral sides of the support platform.

17. The multi-piece snap-in fastener as recited in claim 16, wherein each of the lateral sidewalls includes a slot extending from an upper surface to define a split wall construction and wherein each of the lateral sidewalls includes a positioning protrusion extending inboard from an inboard surface for engagement with an opposing thermal expansion cut-out.

18. A multi-piece snap-in fastener adapted to adjoin a surface element to a backing panel, the fastener comprising:
   a single piece docking base of tray-like construction adapted for adhesive bonding connection to one side of the surface element, the docking base including a pair of opposing lateral sidewalls and a pair of opposing end wall elements, the lateral sidewalls and end wall elements cooperatively defining a discontinuous raised perimeter disposed in raised relation about an interior surface, the interior surface defining a depressed interior portion of the docking base extending in spanning relation between the lateral sidewalls, the lateral sidewalls each including at least one rounded inboard protuberance element projecting in overlying relation to the interior surface, wherein at least one of the lateral sidewalls includes a slot extending from an upper surface to define a split wall construction at least partially along the length of said at least one of the lateral sidewalls and a rounded profile positioning protrusion extending inboard from said at least one of the lateral sidewalls; and
   a displaceable clip head including at least one male projection element extending outwardly from one side of a support platform, the male projection element being adapted for snap fit insertion through an acceptance opening in the backing panel, the support platform being configured for press fit insertion into the docking base in nesting relation between the lateral sidewalls, the support platform including rounded profile outboard protuberance elements projecting outwardly from lateral sides of the support platform such that during insertion of the support platform between the lateral sidewalls, the outboard protuberance elements pass over said inboard protuberance elements and the lateral sidewalls flex outwardly and rebound such that the outboard protuberance elements are disposed in underlapping relation to opposing said inboard protuberance elements projecting from the lateral sidewalls, wherein the support platform further includes at least one thermal expansion cut-out disposed at a lateral side of the support platform and a plurality of standoff posts projecting in the same direction as the male projection element, the thermal expansion cut-out being adapted to matedly engage a positioning protrusion extending inboard from an opposing lateral sidewall, and the standoff posts having a height such that when the outboard protuberance elements are disposed in underlapping relation to opposing said inboard protuberance elements the standoff posts extend above the lateral sidewalls, and wherein at least portions of said end wall elements occupy positions in the width dimension of the docking base inboard from said inboard protuberance elements.

19. The multi-piece snap-in fastener as recited in claim 18, wherein the docking base is a one piece molded structure formed from a nylon or ABS polymer, and wherein the clip head is a one piece molded structure formed from acetal resin.

* * * * *